O. V. SCHAUER.
ATTACHMENT FOR TYPE WRITERS.
APPLICATION FILED AUG. 10, 1908.

954,470.

Patented Apr. 12, 1910.
5 SHEETS—SHEET 1.

WITNESSES:
J. Herbert Bradley
Charles Barnett

INVENTOR
OLIVER V. SCHAUER,
by Christy & Christy
Atty's

O. V. SCHAUER.
ATTACHMENT FOR TYPE WRITERS.
APPLICATION FILED AUG. 10, 1908.

954,470.

Patented Apr. 12, 1910.

5 SHEETS—SHEET 2.

WITNESSES:
J. Herbert Bradley
Charles Barnett

INVENTOR
OLIVER V. SCHAUER.
by Christy & Christy
Atty's

O. V. SCHAUER.
ATTACHMENT FOR TYPE WRITERS.
APPLICATION FILED AUG. 10, 1908.

954,470.

Patented Apr. 12, 1910.
5 SHEETS—SHEET 3.

WITNESSES:
J. Herbert Bradley
Charles Barnett

INVENTOR
OLIVER V. SCHAUER,
by Christy & Christy
Atty's

O. V. SCHAUER.
ATTACHMENT FOR TYPE WRITERS.
APPLICATION FILED AUG. 10, 1908.

954,470.

Patented Apr. 12, 1910.

5 SHEETS—SHEET 4.

WITNESSES:
J. Herbert Bradley.
Charles Barnett

INVENTOR
OLIVER V. SCHAUER.
BY Christy & Christy
Atty's

O. V. SCHAUER.
ATTACHMENT FOR TYPE WRITERS.
APPLICATION FILED AUG. 10, 1908.

954,470.

Patented Apr. 12, 1910.
5 SHEETS—SHEET 5.

WITNESSES:
J. Herbert Bradley
Charles Barnett

INVENTOR
OLIVER V. SCHAUER.
BY Christy & Christy
Atty.

UNITED STATES PATENT OFFICE.

OLIVER V. SCHAUER, OF PITTSBURG, PENNSYLVANIA, ASSIGNOR OF TWO-THIRDS TO EUGENE N. PRICE, OF PITTSBURG, PENNSYLVANIA.

ATTACHMENT FOR TYPE-WRITERS.

954,470. Specification of Letters Patent. Patented Apr. 12, 1910.

Application filed August 10, 1908. Serial No. 447,793.

*To all whom it may concern:*

Be it known that I, OLIVER V. SCHAUER, residing at Pittsburg, in the county of Allegheny and State of Pennsylvania, a citizen of the United States, have invented or discovered a certain new and useful Improvement in Attachments for Type-Writers, of which improvements the following is a specification.

The invention described herein relates to certain improvements in billing attachments for type-writers.

It is desirable in sending out statements to keep a copy of the same and it is customary to make such copies on long sheets. If the statements are short two or more can be copied on the same sheet provided spaces corresponding to the spaces occupied by the printed heading and at the ends of the statements be not left on the long or record sheet.

The present invention has for its object the provision of a suitable stop mechanism whereby the platen of the machine may be turned back after the completion and withdrawal of each original to such a position that the first line written on a new bill head inserted after the platen has been turned back will have a certain predetermined position relative to the last line of the previous statement on the record sheet.

The invention is hereinafter more fully described and claimed.

Figure 1:
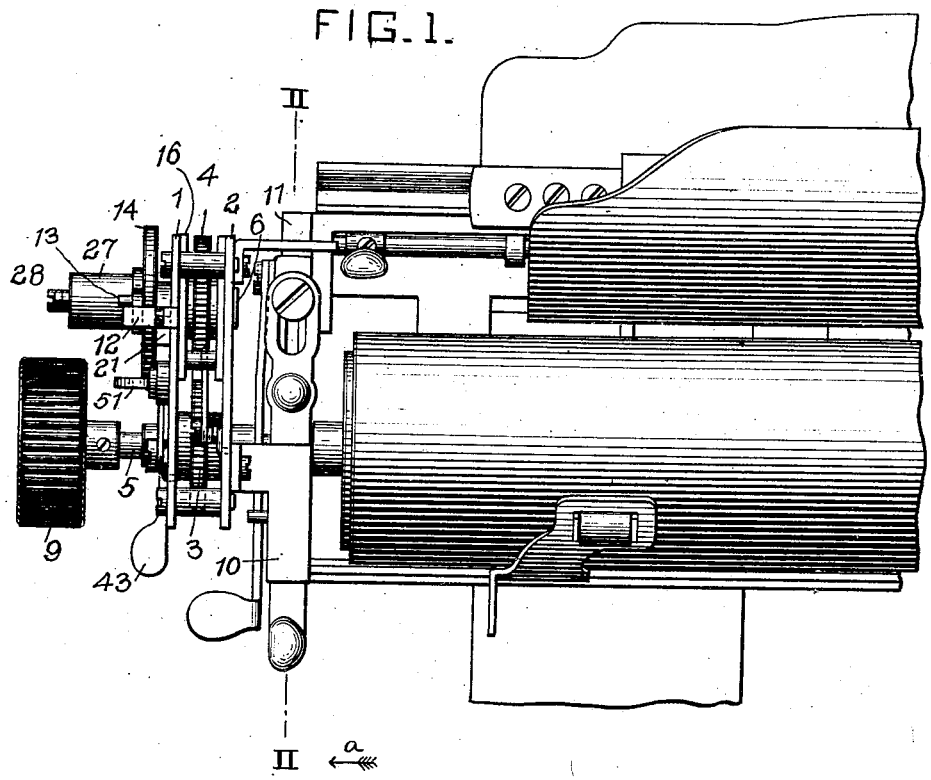
Figure 2:
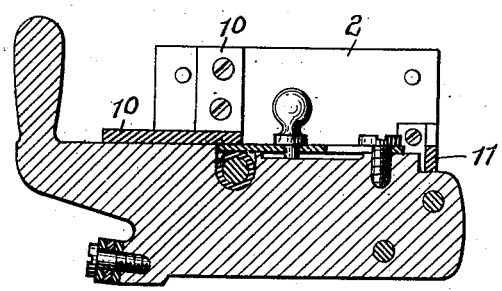
Figure 3:
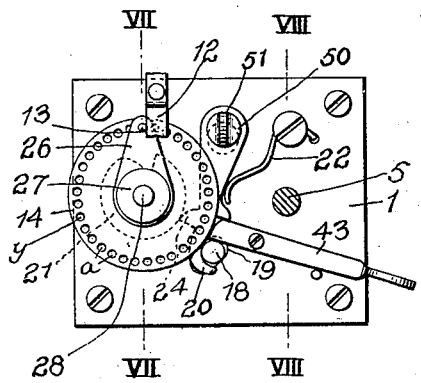
Figure 4:
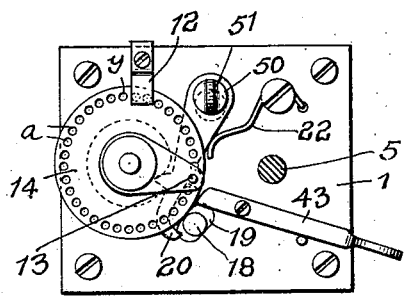
Figure 5:
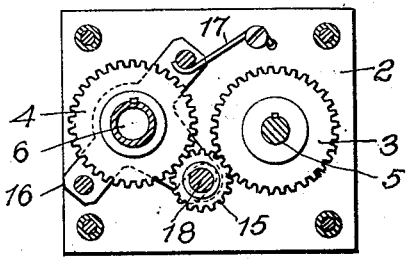
Figure 6:
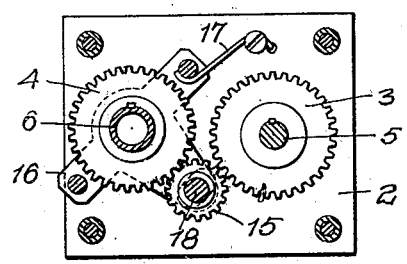
Figure 7:
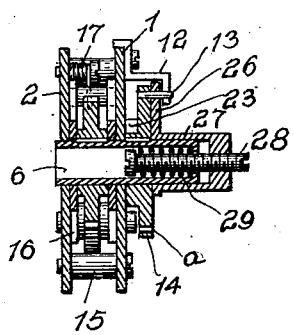
Figure 8:
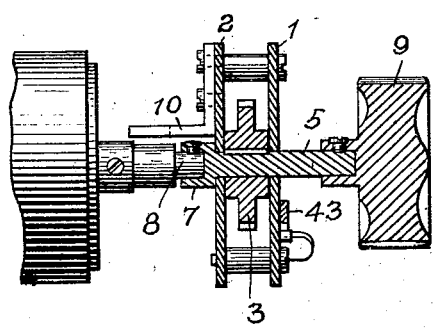
Figure 9:
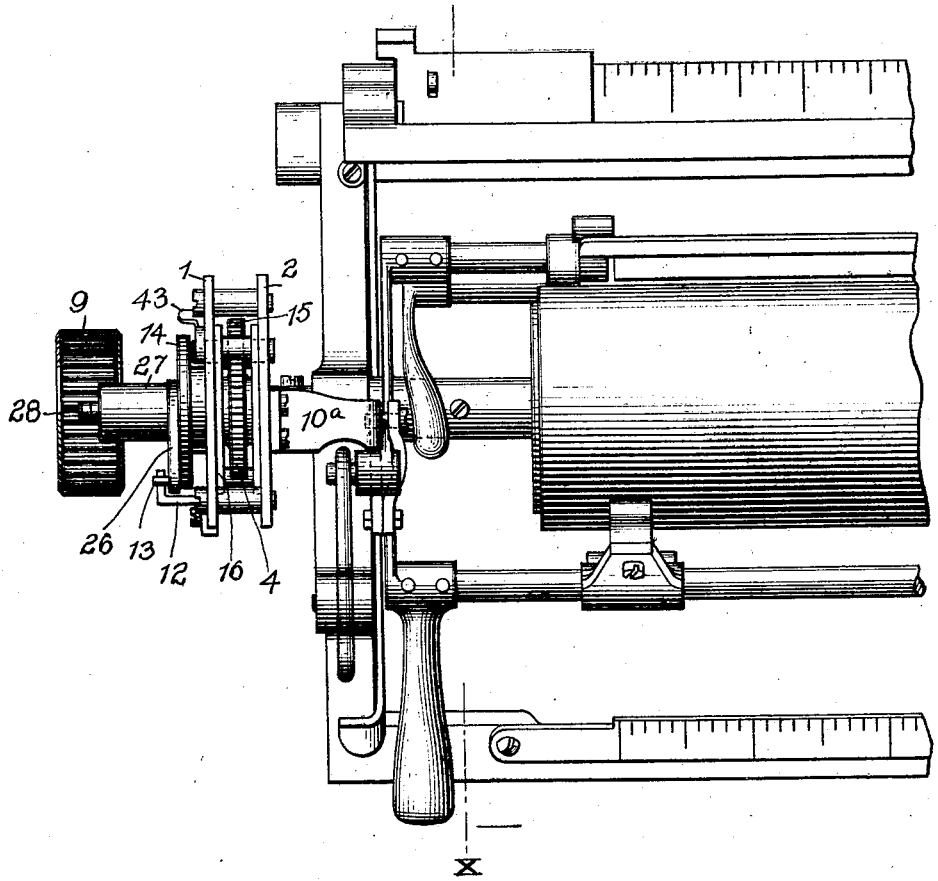
Figure 10:
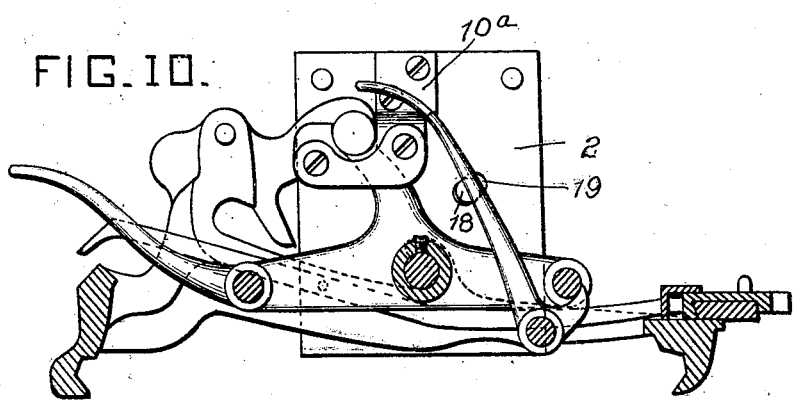
Figure 11:
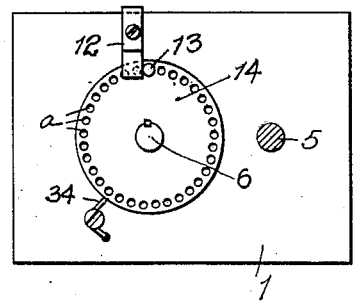
Figure 12:
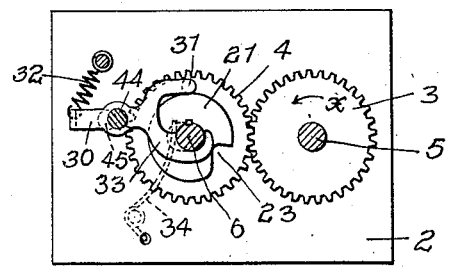
Figure 13:
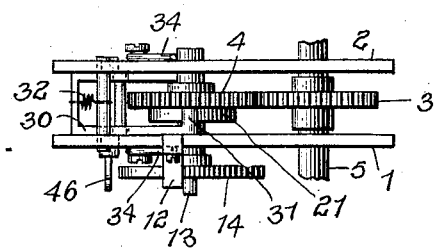
Figure 14:
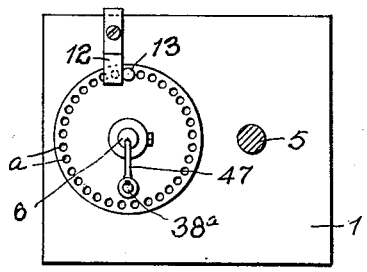
Figure 15:
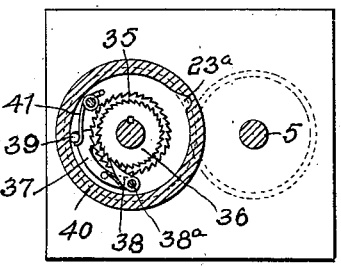
Figures 17, 18:
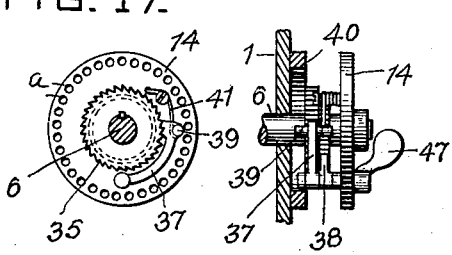
Figure 16:
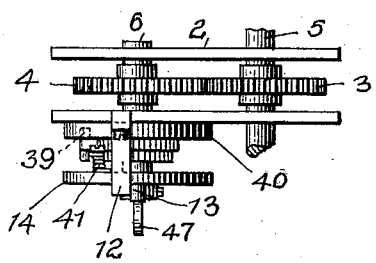

In the accompanying drawings forming a part of this specification Figure 1 is a top plan view of a type-writer having my improved bill-spacing mechanism applied thereto, Fig. 2 is a sectional view on a plane indicated by the line II—II Fig. 1 looking in the direction of the arrow *a*; Figs. 3 and 4 are front elevation of the spacing mechanism illustrating different positions of the parts thereof; Figs. 5 and 6 are sectional views showing the driving connection between the platen shaft and spacing mechanism the position of the parts shown corresponding to those of the parts shown in Figs. 3 and 4; Figs. 7 and 8 are sectional views on planes indicated respectively by the lines VII—VII and VIII—VIII Fig. 3; Fig. 9 is a plan view showing the manner of attaching my spacing mechanism to another form or construction of typewriter; Fig. 10 is a sectional view on a plane indicated by the line X—X Fig. 9; Figs. 11, 12, and 13 show front and sectional elevations and an edge view of a modification of my attachment; Figs. 14, 15, and 16 are similar views of a further modification of the attachment; Figs. 17 and 18 are sectional detail views of the form shown in Figs. 14, 15 and 16, Figs. 19 to 22 illustrate diagrammatically the operation of my attachment in spacing bill heads.

My improvement can be applied with slight modification of the fastening devices to any form of typewriter without any reconstruction or change in the typewriter.

Between two plates 1 and 2 which are secured together but spaced a suitable distance are arranged the pinions 3 and 4 having shafts 5 and 6 supported in bearings formed in openings in the plates 1 and 2. The pinion 3 secured to the shaft 5 is adapted to be driven by the platen shaft and synchronously therewith. In the construction shown in Figs. 1 to 10 this movement of the pinion is attained by connecting the shaft 5 to the platen shaft. This can be conveniently done as shown in Fig. 8 by forming a socket 7 on one end of the shaft 5 for the reception of the end of the platen shaft 8, the opposite end of shaft 5 being constructed to engage a socket on the knob 9.

In applying the attachment to the machine, the knob is removed from the shaft 8, the socket 7 secured on said shaft and the knob 9 fastened on the shaft 5. The back plate 2 is provided with one or more arms or brackets adapted to engage the frame of the machine and hold the controlling attachment in operative position. It will be understood the shape and number of supporting arms or brackets will be changed to suit different constructions of machines to which the attachment is applied.

In applying the attachment to an L. C. Smith & Brother machine, as shown in Figs. 1 and 2 the attachment is provided with two arms 10 and 11, while for connecting the attachment to a Smith Premier as shown in Figs. 9 and 10 only one arm 10ª is necessary.

It is characteristic of my improvement that after the attachment has been set or adjusted for the required backward movement of the platen for the insertion of the new bill head, only the platen is moved. There is only one stop employed for arresting the platen and that during a backward movement, the forward movement of the platen is unlimited and a backward movement to the extent for which the attachment is adjusted can be always had without adjusting any of the parts, and a further and unlimited backward movement can be had by simply shifting a release lever.

The backward movement of the platen is determined by a stop movable by the platen and a stop carried on the frame of the attachment one of said stops being adjustable. In the construction shown the stop 12 on the frame of the attachment is stationary and a stop 13 carried by the spacing disk 14 is adjustable around the same. The disk 14 has when shifted a movement synchronous with and equal to the movement of the platen and is secured on the shaft 6 carrying the pinion 4 which has an indirect driving connection with the platen shaft as shown in Figs. 3 to 8 or a direct connection as shown in Figs. 11 to 16.

In the construction shown in Figs. 3 to 8, the driving connection from the platen to the spacing disk is formed by a pinion 15 carried by a swinging member 16 whereby it is caused to engage the pinions 3 and 6. This frame or member 16 is pivotally mounted preferably on the shaft 6 so that the pinion or idler 15 is constantly in engagement with the pinion 4. A spring 17 is employed to move the pinion or idler toward the pinion 3, but has not sufficient force to hold the idler in engagement with the pinion 3, when the latter is turned if resistance is applied to the idler 15 or pinion 4 to prevent rotation as hereinafter described. One of the journals of the idler, as 18 extends through curved slot 19 in the plates of the attachment and is engaged by a hooked finger 20 when the idler is in engagement with pinion 3 to hold the idler in positive engagement with the pinion. The finger is pivotally mounted and is normally pressed away from the journal 18, and against a cam 21, by the spring 22. The cam which is carried by the shaft 6 is provided with a notch 23 into which a lug 24 on the finger 20 is forced by the spring. The movement of the finger, when the lug enters the notch releases the journal of the idler and locks the shaft 6 and parts carried thereby as against movement in a direction imparted by the forward movement of the platen. As the shaft 6 and the idler 15 are locked as against rotation by the lug 24, and the idler held in engagement with the pinion 3 only by the spring 17, the platen is free to be rotated forward as when so rotated, the pinion 3 will shift the idler out of engagement with such pinion.

As before stated the adjustable stop for arresting the backward movement of the platen in connection with the fixed stop may be arranged either on the disk 14 or upon the frame of the attachment. In the construction shown such stop is arranged on the disk 14 and consists of a pin 13 carried by an arm 26 formed on a cap 27 loosely mounted on the projecting end of the shaft 6 as clearly shown in Fig. 7. This shaft is made hollow and the screw 28 passes through the end of the shaft and engages the top of the cap 27, a spring 29 being interposed between the head of the screw and the closed end of the shaft. This spring serves to push the cap with the pin toward the disk 14 and hold the latter in engagement with perforations *a* formed around the disk. The spacings of these perforations correspond with the distances between the teeth in the platen spacing mechanism of the machine. This construction affords a convenient means for adjusting the stop 13 to any desired position around the disk.

In Figs. 11, 12 and 13 is shown a modification of my improvement, in which the bill spacing attachment is driven directly from the platen shaft 5. The pinion 3 on said shaft intermeshes directly with the pinion 4 on the shaft 6, which, as shown in Fig. 12 has its journals arranged in slots in the front and back plates of the attachment. On this shaft is also secured a cam 21 having a notch 23 as heretofore described. A lever 30 forked at one end is pivotally mounted in the frame of the attachment, one of said forks being provided with a stop 31 adapted to engage the notch 23 in the cam, a spring 32 connected to the lever tending to shift the same in a direction to cause the stop 31 to enter the notch. The other arm 33 of the lever is adapted to bear against shaft 6 and hold the shaft in a position to positively lock the pinion 4 in engagement with the pinion 3. This positive locking however is only effective when the platen is turned backward to insert a bill head and during a portion of the forward movement of the platen immediately following the insertion of the bill head. When the platen is turned forward or in the direction of the arrow *x*, the shaft with the cam 21 is rotated in the reverse direction until the slot 23 arrives opposite the stop 31 when the latter will be shifted into such notch, locking the shaft and cam and pinion 4 as against further rotation in the same direction. Simultaneous with the locking of the shaft as against such rotation, the arm 33 on the lever is shifted out of engagement with the shaft 6 so that if the pinion 3 be further rotated in a forward direction the pinion 4 will be forced out of engagement therewith, such movement of the pinion 4 being resisted only by a spring 34 tending to force the pinion 4 into engagement with the pinion 3. A disk 14 carried by the shaft 6 partakes of the motion of such shaft. This disk is provided with perforations *a* as heretofore described, for the reception of a stop 13 which in this case is formed by a pin inserted in such perforations. The backward movement of the platen during which time the pinion 4 is positively locked thereto, will continue until the pin 13 comes into engagement with the other stop on the frame of the machine.

In Figs. 14 to 18, inclusive, I have shown a further modification of my improvement. The pinion 3 on the platen shaft intermeshes as before with the pinion 4 of the shaft 6. On this shaft are also keyed toothed wheels 35 and 36 with which pawls 37 and 38 will engage. The pawls are pivotally mounted upon the spacing disk 14. As the platen is rotated in the feed direction, the shaft 6 will be rotated in the opposite direction, or if an idler be interposed between the two in the same direction as the platen. The toothed wheel 35 will through the medium of the pawl 37 drag the disk 14 around in the same direction until a shoulder 39 on the pawl 37 comes into alinement with a notch 23$^a$ formed in the inner wall of an annular projection 40 from the plate on the attachment. The pawl is shifted so as to cause the stop or shoulder 39 to enter said notch by a spring 41 and by the engagement of the stop with this notch further rotation of the shaft 6 and the parts carried thereby is checked. The movement of these parts at such time is such as will be imparted by the platen when rotated forward, but when the rotation of the platen is reversed or the latter is turned backward, the first movement of the shaft will cause the disk 14 to move therewith by reason of the engagement of the pawl 38 carried by the disk with the toothed wheel 36. This movement of the disk 14 will draw the pawl 37 along with it, the stop 39 being forced out of the notch 23$^a$ by the shape of the inner wall of the ring 40. The movement of the shaft 6 will continue until the stop pin 13 engages the stationary stop.

In order to permit a free turning back of the platen for the purposes of correction or other purposes, a release is provided so that such turning back will not effect or operate the bill spacing device. In the construction shown in Figs. 3 to 8 inclusive, this release consists of a lever 43 pivotally mounted on the frame of the attachment and adapted to engage the journal of the idler 15, and shift the same out of engagement with the pinion 3, against the tension of the spring 17. In the construction shown in Figs. 11 to 13, the pivot pin 44 of the lever 30 is provided with an eccentric portion 45, on which the lever is mounted, and such pin is provided with an operating handle 46. By turning this pivot 44 the lever 32 will be drawn backward so as to move the arm 33 away from the shaft 6 so that the pinion 4 may on the rotation of the pinion 3, be pushed out of engagement with the latter, and permit a free turning of the platen shaft backward without affecting the attachment.

In the construction shown in Figs. 14 to 18, the pawl 38 is keyed to the pivotal shaft 38$^a$, which is loosely mounted in the side plates and such shaft is provided with a turning handle 47. By turning this handle the pawl 38 will be drawn out of engagement with the toothed wheel 36 and that without affecting the pawl 37 which is loosely mounted on the same pivotal shaft.

Figure 19:
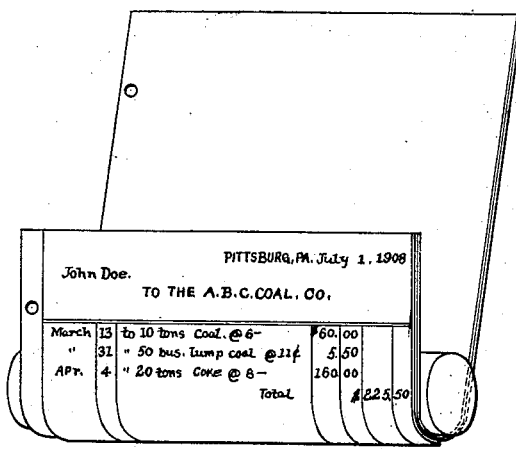
Figure 20:
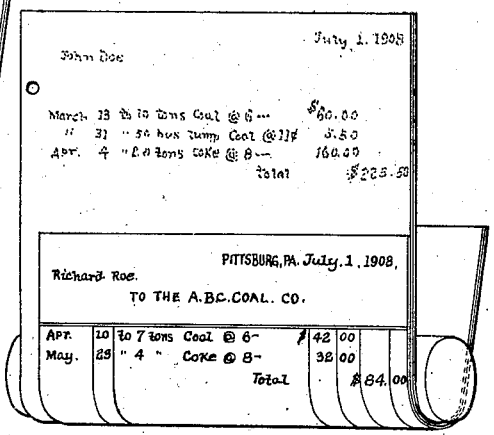
Figure 21:
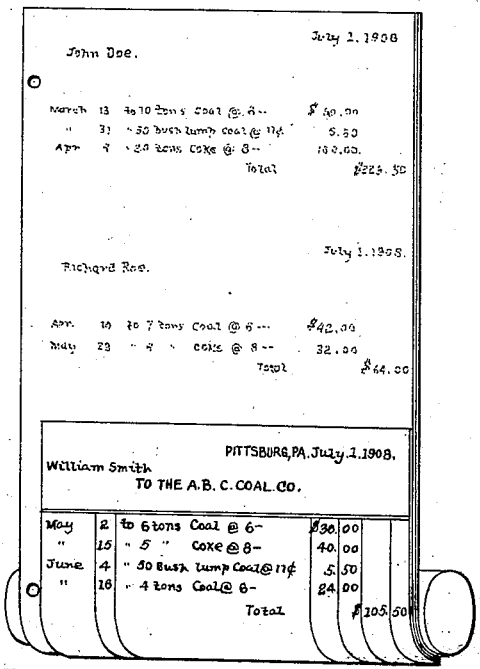
Figure 22:
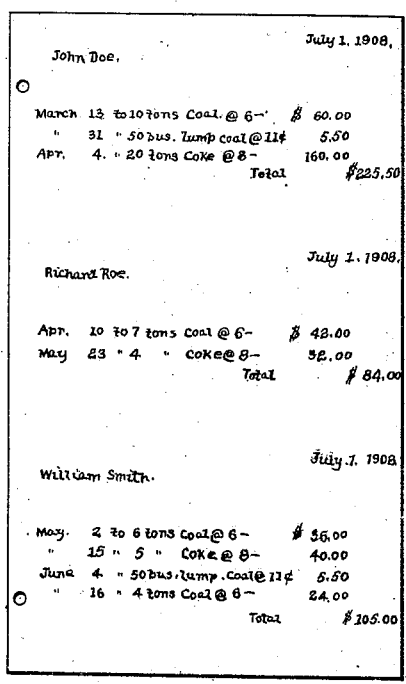

In Figs. 19 to 22, I have illustrated the manner of operation of my attachment. Fig. 19 shows a platen, the long record sheet and a bill head with a carbon paper between them. The bill head is completed and ready to be removed from the machine. After the removal of the bill head the platen is turned back until the stop of the disk 14 will come in contact with the stationary stop on the frame of the attachment. The distance or number of spaces of this backward movement will of course depend upon the length of the printed matter of the bill head and the distance desired between the adjacent bills or statements. If it is desired to separate the bills by about six spaces, and the printed matter of the bill head occupies about twenty-four spaces, the operator will in the form of the apparatus shown in Figs. 3 to 8, when the attachment is in the position shown in Fig. 4, with the lug of the finger 20 in engagement with notch 23 of the cam, count back from the first perforation $y$ to the left of the stationary stop eighteen spaces and shift the cap so as to insert the pin 26 into that eighteenth perforation. The parts of the attachment will now occupy relative to such attachment a position corresponding to the printing line of the machine. After the completion of the bill head within the machine the bill head is released and withdrawn and the platen is turned backward thereby carrying the long sheet and the carbon back eighteen spaces, at which time the stop pin 23 will engage with the stationary stop of the attachment. A second bill is now introduced and the bill moved forward to bring the first printing line of the new bill head to the printing line of the machine at which time the parts of the machine will occupy the position shown in Fig. 4.

By reference to Figs. 5 and 6 it will be observed that the idler or transmitting pinion 15 is so arranged with reference to the pinion 3 that when the platen is turned forward the pinion will tend to push the idler or transmitting pinion 15 out of engagement, but when the platen is rotated backward, the direction of rotation of the pinion 3 supplements the action of the spring 17 to move the idler into engagement with the pinion.

It will be observed that the lever 43 is operative only when the idler is unlocked and the pinion 4 locked, and in order that the idler may be unlocked so as to permit the backward movement of the platen at any time after the stop 13 has moved away from the stop 12 on the forward rotation of the platen and before the finger 20 is released from the cam 21 provision is made by shifting the finger 20 lengthwise. This can be done by forming the pivot pin 50 with an eccentric portion on which the finger will swing. By turning the pin by a handle 51 the finger can be shifted to unlock the idler.

I claim herein as my invention:

1. A bill spacing attachment for typewriters having in combination an adjustable stop, means operated by the platen for shifting said stop, a second stop arranged to engage the first stop when operated by the platen in its backward movement, and a lock operated by the stop shifting means for maintaining such means in driving connection with the platen and operative to separate the elements of such driving connection after a predetermined forward movement of the platen.

2. A billing attachment for typewriters, having in combination a stop adapted to be shifted by the platen, a second stop arranged to engage the first stop when operated by the platen in its backward movement, means operative by the platen in its forward movement to separate the elements forming the driving connection of the first stop with the platen during the forward movement of the platen, and manually operated means for releasing the first stop from driving connection with the platen.

3. A billing attachment for typewriters having in combination a shaft carrying a stop, a platen shaft, a separable gearing connection between said shafts, means operative on the backward movement of the platen to maintain the gear members in engagement and operative on the forward movement of the platen to effect a disengagement of the gear members, a stop arranged to engage the first stop when shifted by the backward movement of the platen and a manually operated means for disengaging the members.

4. A billing attachment for typewriters having in combination a stop adapted to be shifted by the platen through a predetermined range of movement; a second stop arranged to engage the first stop when moved by the platen in its backward movement and thereby arrest such backward movement of the platen, and means operating automatically on the backward movement of the platen to lock the stop in driving connection with the platen and to separate the elements of such driving connection at the opposite or forward end of its range of movement.

5. A billing attachment for typewriters having in combination a stop adapted to be shifted by the platen through a predetermined range of movement, a second stop arranged to engage the first stop when moved by the platen in its backward movement and thereby arrest such backward movement, means operating automatically on the backward movement of the platen to lock the stop in driving connection with the platen and to separate the elements of such driving connection at the opposite or forward end of its range of movement, and manually operated means for releasing the stop from driving connection with the platen.

6. A billing attachment for typewriters having in combination a pinion rotatable by the platen, a second pinion, a stop movable by the second pinion, a second stop arranged to arrest the first stop and its operating parts on the backward movement of the platen and an idler movable into and out of engagement with one of said pinions.

7. A billing attachment for typewriters having in combination a pinion rotatable by the platen, a second pinion, a stop movable by the second pinion, a stationary stop, an idler, means for shifting the idler so as to be in engagement with both pinions and means for locking the idler in such engagement.

8. A billing attachment for typewriters having in combination a pinion rotatable by the platen, a second pinion carrying a stop, a stationary stop, an idler yieldingly held in position to engage both pinions and means for positively locking the idler in engagement with said pinions.

9. A billing attachment for typewriters having in combination a pinion rotatable by the platen, a second pinion carrying a stop, a stationary stop, an idler yieldingly held in position where it will be in engagement with said pinions, and means operative by the second pinion for positively locking the idler in such engagement.

10. A billing attachment for typewriters having in combination a pinion rotatable by the platen, a second pinion carrying a stop, a stationary stop, an idler adapted to transmit motion from one pinion to the other, and means controlled by one of the pinions for locking the idler so as to engage both pinions, and means for arresting the movement of the stop carrying pinion when the idler unlocked.

11. A billing attachment for typewriters having in combination a pinion rotatable by the platen, a second pinion carrying a stop, a stationary stop, a lock for preventing the rotation of the pinion carrying the stop, an idler yieldingly held in position where it will engage both pinions and means for shifting the pinion lock and for locking the idler in such engagement.

12. A billing attachment for typewriters having in combination a pinion rotatable by the platen, a second pinion carrying a stop, a stationary stop, an idler for transmitting motion from one pinion to the other, means for locking the idler in position where it will be in engagement with said pinions, and means manually operated for shifting the lock.

13. A billing attachment for typewriters having in combination a pinion rotatable by the platen, a pinion carrying a stop, a stationary stop, an idler yieldingly held in position where it will engage both pinions, means for alternately locking the idler in such engagement and the stop carrying pinion from movement, and manually operated means for shifting said locking means.

14. A billing attachment for typewriters having in combination a pinion rotatable by the platen, a pinion carrying a stop, a stationary stop, an idler, means for shifting the idler to a position where it will be in engagement with both pinions and manually operated means for shifting the idler away from one of said pinions.

15. In a billing attachment for typewriting machines, the combination with a rotatable platen, a pinion rotatable with the platen, a second pinion, a stop movable with the second pinion, a stationary stop, an idler mounted in constant engagement with said second pinion, means for shifting the idler into engagement with said first mentioned pinion and means for locking the idler in such engagement.

In testimony whereof, I have hereunto set my hand.

OLIVER V. SCHAUER.

Witnesses:
CHARLES BARNETT,
FRANCIS J. TOMASSON.